Patented Mar. 10, 1936

2,033,866

UNITED STATES PATENT OFFICE 2,033,866

PROCESS FOR THE PRODUCTION OF ALIPHATIC OR CYCLOALIPHATIC PRIMARY AMINES

Walther Schrauth, Berlin-Dahlem, Germany, assignor, by mesne assignments, to "Unichem" Chemikalien Handels A.-G., Zurich, Switzerland, a corporation of Switzerland No Drawing. Application August 12, 1932, Serial No. 628,551. In Germany August 13, 1931

10 Claims. (Cl. 260—127)

The method discovered by Sabatier and Mailhe for converting the aliphatic alcohols with ammonia into amines in the presence of catalytic substances at elevated temperatures requires temperatures above 300° C. and produces yields containing only relatively small quantities of primary amines, because even by the use of excess ammonia always secondary amines and unsaturated hydrocarbons, the condensation products thereof and ethers are produced as undesirable by-products.

Now it has been found that it is possible to use this reaction for production of primary amines from higher molecular aliphatic alcohols or naphthenic alcohols in a more profitable manner if the conversion is carried out at higher pressures. By this process the amines are produced in a technical measure in a very good yield and the above mentioned disadvantages are considerably avoided because the formation of by-products amounts to less than 10%. Moreover the activity of the catalysts used is preserved for a very long time in spite of much use with a greater conversion of the products treated. Higher molecular aliphatic alcohols containing 8 carbon atoms or more are found as especially adapted for this conversion. It has been found in accordance with the present invention that even at relatively low pressures a more favourable conversion is obtained than when proceeding according to the method specified by Sabatier. It is advantageous however to carry out the reaction at higher pressures especially at pressures above 50 atmospheres. The dehydrating catalysts known in the literature are suitable, as for instance metallic oxides, whereof among others aluminum-, magnesium-, thorium-, molybdenum-oxide are especially adapted. These metal oxides are suitable for use alone or in admixture with each other in the form of mixed catalysts. This reaction proceeds at temperatures between 300 and 450° C. and in the presence of an excess of ammonia, the unconsumed parts of which can be conducted anew to the reaction space after separating the products formed.

The amines produced according to the process in question are useful for combating insect pests, as wetting-out agents and for treating rubber. In the following the process will be illustrated by a few typical examples, without confining it to the special modes in action described in any example.

Example I

If 1 part by volume of cetyl alcohol which is first liquefied is conducted, together with 3 parts by volume of ammonia, through a reaction tube resistant to pressure, which tube is filled with a catalyst consisting of aluminum-oxide masses hardened by addition of a magnesium-nitrate solution and heating, and is held at a pressure of 120–130 atmospheres and at 380–400° C., a watery-oily liquid is obtained from the resulting vapours when condensed. This liquid finally coagulates partially and by distillation gives a yield of 94 to 95% cetyl amine.

Example II

If instead of cetyl alcohol as described in Example I, the higher molecular fatty alcohols obtained by the reduction of cocoanut-oil or palm-kernel oil, which boil at 10 mm. pressure of mercury between 85 and 160° C. are treated in the same manner a yield of 93 to 95% of a mixture of primary amines is obtained containing especially dodecyl amine.

Example III

From naphthenic alcohols (acetyl saponification number 206), which at 20 mm. pressure of mercury distill over between 90 and 206° C. and which are obtained by reduction of commercial naphthenic acid, a yield of about 90–92% of the corresponding primary amines is obtained at 350–380° C. and under a pressure of 180 atmospheres by passing the alcohols with 3 to 4 times their volume of ammonia over a contact catalyst consisting of equal part of thorium-oxide and aluminum-oxide consolidated by chromic acid.

Example IV

If 1000 parts by weight of stearyl alcohol after adding 5% aluminum-oxide activated with zinc-oxide are heated up to 340 to 350° C. at 140 to 150 atmospheres pressure in an atmosphere of ammonia for a few hours a good yield of octadecyl amine is obtained.

What I claim is:—

1. The method of producing primary amines which comprises reacting alcohols of the group consisting of the aliphatic alcohols having 8 or more carbon atoms, and naphthenic alcohols with ammonia at pressures above 50 atmospheres and at temperatures of about 300 to about 450° C. in the presence of dehydrating metal oxide.

2. The method of producing primary amines which comprises reacting aliphatic alcohols having 8 or more carbon atoms in the molecule with ammonia at super-atmospheric pressure in the presence of dehydrating metal oxide.

3. The method of producing primary amines which comprises reacting aliphatic alcohols having 8 or more carbon atoms in the molecule and ammonia at super-atmospheric pressure and at temperatures of about 300 to about 450° C. in the presence of dehydrating metal oxide.

4. The method of producing primary amines which comprises reacting aliphatic alcohols having 8 or more carbon atoms in the molecule with ammonia at pressures above 50 atmospheres in the presence of dehydrating metal oxide.

5. The method of producing primary amines which comprises reacting aliphatic alcohols having 8 or more carbon atoms in the molecule with ammonia at pressures above 50 atmospheres and at temperatures of about 300 to about 450° C. in the presence of dehydrating metal oxide.

6. The method of producing primary amines which comprises reacting cetyl alcohol with ammonia at a pressure of about 120 to about 130 atmospheres at a temperature of about 380 to about 400° C. in the presence of dehydrating metal oxide.

7. The method of producing primary amines which comprises reacting alcohol obtained by the reduction of cocoanut oil with ammonia at a pressure of about 120 to about 130 atmospheres and at a temperature of about 380 to about 400° C. in the presence of dehydrating metal oxide.

8. The method of producing primary amines which comprises reacting naphthenic alcohol with ammonia at a pressure approximating 180 atmospheres and at a temperature of about 350 to about 380° C. in the presence of dehydrating metal oxide.

9. The method of producing primary amines which comprises reacting aliphatic alcohol having 16 to 18 carbon atoms in the molecule with ammonia at a pressure of about 120 to about 150 atmospheres and at a temperature of about 340 to about 400° C. in the presence of a dehydrating metal oxide, substantially as described.

10. The method of producing primary amines which comprises reacting aliphatic alcohols having 8 or more carbon atoms in the molecule with ammonia at pressures above 50 atmospheres and at temperatures of about 300 to about 450° C. in the presence of a catalyst of the group consisting of aluminum oxide, magnesium oxide and thorium oxide.

WALTHER SCHRAUTH.